United States Patent
Candido

(10) Patent No.: US 9,884,601 B1
(45) Date of Patent: Feb. 6, 2018

(54) MOUNTING ASSEMBLY FOR VEHICLE BULL BAR

(71) Applicant: GM GLOBAL TECHNOLOGY OPERATIONS LLC, Detroit, MI (US)

(72) Inventor: Artur Z. Candido, Tarneit (AU)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/383,125

(22) Filed: Dec. 19, 2016

(51) Int. Cl.
*B60R 19/52* (2006.01)
*B60R 19/34* (2006.01)

(52) U.S. Cl.
CPC .............. *B60R 19/52* (2013.01); *B60R 19/34* (2013.01); *B60R 2019/522* (2013.01)

(58) Field of Classification Search
CPC ... B60R 2019/522; B60R 19/52; B60R 19/44; B60R 19/34
USPC ........................ 296/187.09; 293/54, 144, 143
See application file for complete search history.

(56) References Cited

U.S. PATENT DOCUMENTS

| | | | |
|---|---|---|---|
| 2011/0006553 A1* | 1/2011 | Fretz | B60R 19/48 293/115 |
| 2014/0306469 A1* | 10/2014 | Drever | B60R 19/52 293/115 |
| 2015/0061307 A1* | 3/2015 | Nakanishi | B60R 19/34 293/133 |
| 2017/0088076 A1* | 3/2017 | Fujimoto | B60R 19/44 |
| 2017/0274849 A1* | 9/2017 | Jordan | B60R 19/04 |

* cited by examiner

*Primary Examiner* — Jason S Morrow
(74) *Attorney, Agent, or Firm* — Quinn IP Law

(57) ABSTRACT

Presented herein are bull bar mounting assemblies, methods for making and methods for using such mounting assemblies, and vehicles with mounting assemblies affixing bull bars to the vehicle chassis. A bull bar mounting assembly includes an elongated chassis rail with a first longitudinal end attached to the vehicle chassis, and a second longitudinal end with a mounting plate for attaching to the bull bar device. An L-shaped flexible mounting bracket has a coupling base attached to the chassis rail adjacent to and spaced from the mounting plate, and a coupling flange projecting from the coupling base for attaching to the bull bar device and mounting plate. The flexible mounting bracket may expand from an undeformed state, where at the coupling flange is spaced from and unattached to the mounting plate, to a deformed state, whereat the coupling flange abuts and attaches to the mounting plate and bull bar device.

20 Claims, 2 Drawing Sheets

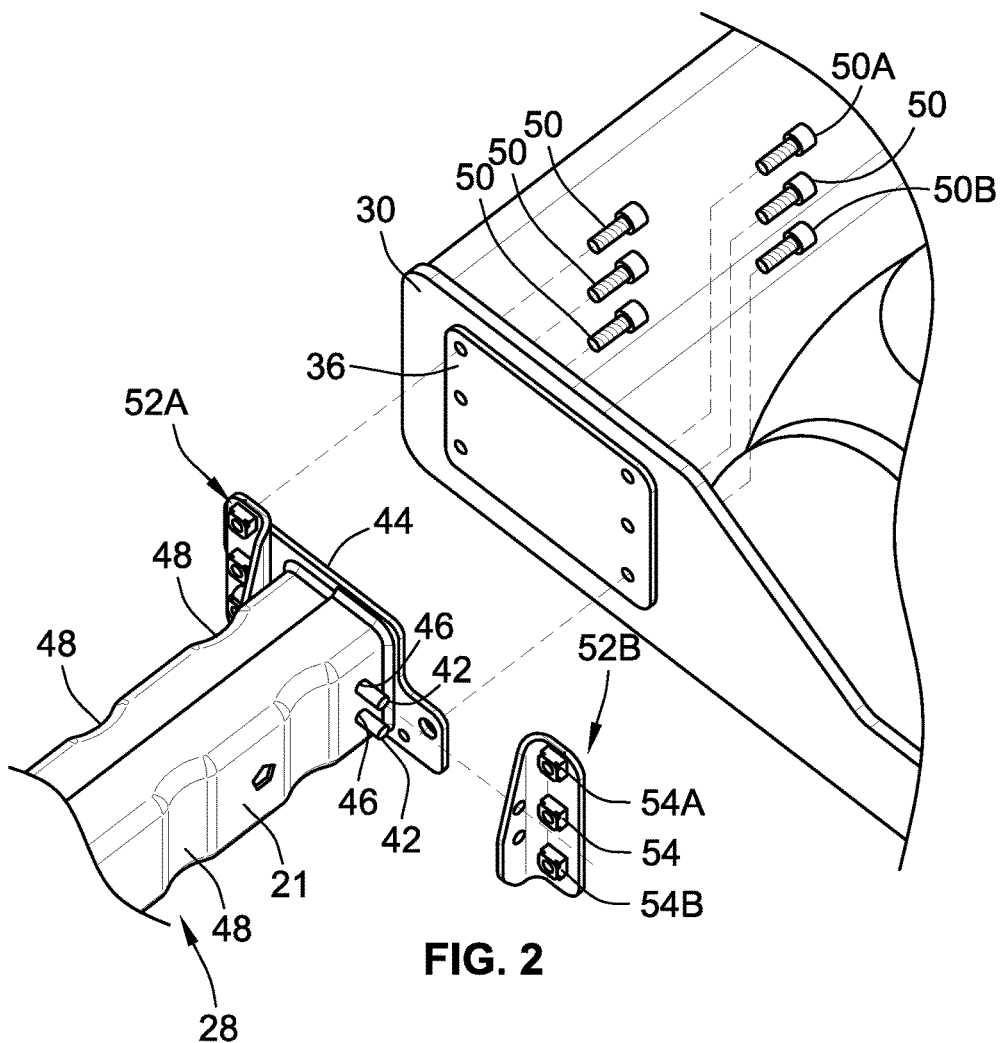
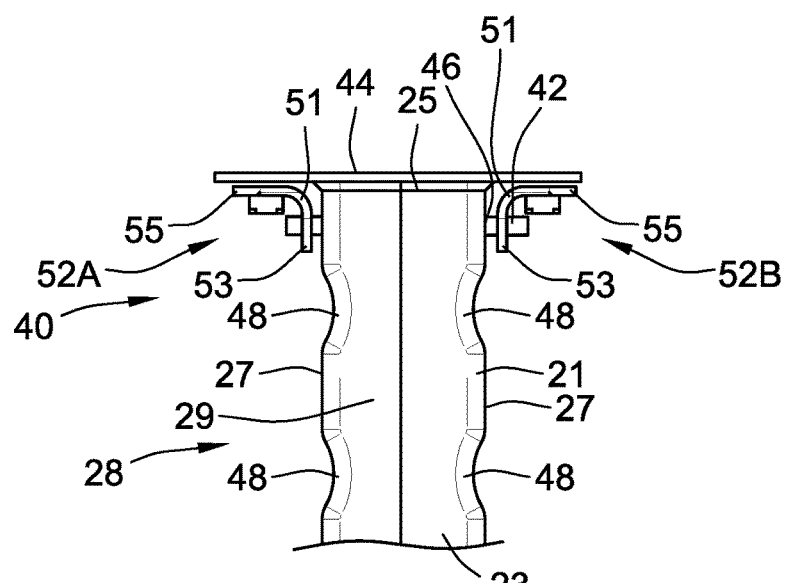

MOUNTING ASSEMBLY FOR VEHICLE BULL BAR

INTRODUCTION

The present disclosure relates generally to bumpers, bull bars and other impact protection components for motor vehicles. More specifically, aspects of this disclosure relate to mounting assemblies for affixing a bull bar device to a motor vehicle.

Current production motor vehicles, such as the modern-day automobile, are originally equipped with impact protection components for absorbing a kinetic energy pulse generated from an impact event between the vehicle and an external object. The most prevalent type of impact protection component is the front and rear vehicle bumper structure. A vehicle bumper is normally composed of a high-strength yet deformable crossbeam that is rigidly secured to the body in white (BIW) chassis and covered by an A-surface cladding (more commonly known as a "bumper fascia"). Bumper crossbeams are typically designed to deform in a controlled and predictable manner to optimize impact energy absorption, while the bumper fascia is merely provided as an aesthetically appealing shell for concealing the crossbeam. Bumper mounts and crush towers may be incorporated to support the bumper crossbeam and fascia on the vehicle frame and to provide additional energy absorption and attenuation.

Serving as a supplementary protective device, a bull bar device may be mounted on or in front of a bumper structure, cantilevered to the chassis of the vehicle. Many bull bars, which are also commonly known as "nudge bars" and "grill guards," use a web of welded metal tubes to protect the front of a vehicle from stray wildlife, tree branches, and other objects that may dent the bumper fascia, break lamp lenses, damage grilles, and scratch exterior surfaces so as to degrade the vehicle's appearance. An optional brush guard may be added to provide locations for installing a winch, tow hooks, fog lamps, and other optional equipment. Some original equipment and aftermarket bull bars are bolted to crush boxes that, in turn, mount to the inner bumper crossbeam or vehicle chassis. The crush box helps to ensure that the addition of a bull bar device will not alter the inertial pulse of the vehicle during an impact event.

SUMMARY

Disclosed herein are bull bar mounting assemblies for motor vehicles, methods for making and methods for using such bull bar mounting assemblies, and motor vehicles with a mounting assembly securely affixing a bull bar device to the vehicle frame. By way of example, and not limitation, there is presented a novel mounting system for securely attaching a bull bar device to the front or rear end of a vehicle chassis. In an example, the mounting system utilizes two pairs of L-shaped brackets, with each pair fastened by high-strength steel pins to opposing lateral sidewalls of an elongated front rail of the vehicle's chassis. Pin slots or circular holes for receiving the high-strength steel pins pass transversely through the front rail of the chassis, positioned between a mounting plate at the forward end of the chassis front rail and a series of crush initiator beads spaced along the length of the rail. When secured to the sidewalls of the front rail, a forward facing coupling flange of each L-shaped mounting bracket is spaced a predetermined gap-distance from the rail's mounting plate. The steel pins are then preloaded by bolting the forward facing coupling flanges of the brackets to a rear attachment interface of the bull bar, which may be in the nature of a complementary coupling plate on the rear face of the bull bar's winch carrier.

Attendant benefits for at least some of the disclosed concepts include a simplified and cost effective system for quickly and securely mounting a bull bar (with or without optional winch device) to a vehicle frame. With the foregoing design, the bull bar may be cantilevered directly to the chassis structure of the vehicle without the need for a crush box or other add-on energy-absorbing component to ensure that the inertial pulse of the vehicle is not changed. At least some of the disclosed configurations provide an attachment that may resist at least about 40 to 42 kilonewtons (kN) of fore-aft load at about 0 to 45 degrees on a bull bar device without modifying the impact performance of the vehicle. Disclosed designs help to enable aftermarket installation of the bull bar without a significant redesign to the vehicle or the need to develop a specific crash box for each vehicle platform.

Aspects of the present disclosure are directed to bull bar mounting assemblies for securely affixing bull bar devices (with or without an optional winch) to vehicle frames. Disclosed, for example, is a mounting assembly for attaching a bull bar device to a motor vehicle. The mounting assembly includes a chassis rail with an elongated body having opposing first and second longitudinal ends. The first longitudinal end of the chassis rail is integrally formed with, welded on, or otherwise attached to the vehicle chassis. In contrast, the second longitudinal end includes a mounting plate that attaches to the bull bar device. The mounting assembly also includes one or more mounting brackets, each composed of a flexible body having a coupling flange projecting angularly from a coupling base. The coupling base, which is attached to the chassis rail, e.g., via one or more high-strength pins, is positioned adjacent to but spaced apart from the mounting plate. The coupling flange is attaches to the bull bar device and the mounting plate, e.g., via one or more bolts. The flexible body of the mounting bracket may expand from an undeformed state to a deformed state. When the mounting bracket is undeformed, the coupling flange is spaced from and unattached to the mounting plate and bull bar device. Conversely, when the bracket is deformed, the coupling flange abuts and attaches to the mounting plate and the bull bar device.

Other aspects of the present disclosure are directed to motor vehicles with bull bar mounting systems for securely affixing bull bar devices to the vehicle frame. A "motor vehicle," as used herein, may include any relevant vehicle platform, such as passenger vehicles (internal combustion engine (ICE), hybrid, electric, fuel cell, etc.), commercial vehicles, industrial vehicles, tracked vehicles, all-terrain vehicles (ATV), farm equipment, trains, etc. While not per se limited, the disclosed features have particular applicability to pickup trucks and other off-road and commercial work vehicles, including sport utility vehicles (SUV), cargo vans, utility task vehicles (UTV), ATV's, dune buggies, rock crawlers, sand rails, etc. In an example, a motor vehicle is disclosed that includes a vehicle chassis, a bumper rail attached to the front end of the chassis, and a bull bar device disposed forward of the bumper rail. A bull bar mounting assembly securely affixes the bull bar device to the motor vehicle's chassis.

The foregoing bull bar mounting assembly includes a pair of chassis front rails, each of which includes an elongated tubular body with opposing longitudinal ends connected by lateral sidewalls. Each sidewall is formed with a series of crush initiator beads spaced along the length of the chassis rail body. The first longitudinal end of each rail is attached to the front end of the vehicle chassis, whereas the second longitudinal end includes a mounting plate that abuts a rear mounting interface of the bull bar device. The mounting assembly also includes two pairs of mounting brackets. Each bracket includes a flexible L-shaped body with a coupling flange projecting generally orthogonally from a coupling base. The coupling base is attached to a respective sidewall of a chassis rail, adjacent to and spaced from one of the mounting plates. The coupling flange is bolted to and abuts the mounting plate and rear mounting interface of the bull bar device. Each mounting bracket expands from an undeformed state, when the coupling flange is spaced from and unattached to the mounting plate, to a deformed state, when the coupling flange is attached to and abuts the mounting plate and bull bar device.

Additional aspects of this disclosure are directed to methods of making and methods of using bull bar mounting assemblies. For instance, a method is disclosed for attaching a bull bar device to a motor vehicle. The method includes, in any order and in any combination: attaching a first longitudinal end of the elongated body of a chassis rail to the vehicle chassis; positioning a mounting plate, which is attached to a second longitudinal end of the chassis rail's elongated body, against the bull bar device; positioning one or more mounting brackets against the chassis rail, the mounting bracket including a flexible body with a coupling flange projecting at angularly from a coupling base; attaching the coupling base of the mounting bracket to the elongated body of the chassis rail such that the coupling base is adjacent to yet spaced apart from the mounting plate; and, attaching the coupling flange to the bull bar device and the mounting plate, e.g., via one or more bolts. When the coupling flange is properly attached, the flexible body of the mounting bracket expands from an undeformed state, where the coupling flange is spaced from and unattached to the mounting plate and bull bar, to a deformed state, where the coupling flange abuts and attaches to the mounting plate and bull bar device. Attaching the coupling base to the elongated body may include fitting one or more high-strength pins through one or more bolt holes in the coupling base and one or more pin slots or circular holes in the chassis rail. The first longitudinal end of the chassis rail may be attached to the front end or rear end of the vehicle chassis. For some embodiments, attaching the chassis rail to the vehicle chassis includes integrally forming the rail with the vehicle chassis.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIG. 2 is an enlarged partially exploded perspective-view illustration of the representative bull bar mounting assembly of FIG. 1 showing a representative chassis front rail coupling to a rear attachment interface of the bull bar device via flexible L-shaped mounting brackets in accordance with aspects of the present disclosure.

FIG. 3 is a plan-view illustration of the chassis front rail and L-shaped mounting brackets of FIG. 2 showing the L-shaped mounting brackets in an undeformed state, spaced a predetermined gap-distance from the front rail mounting plate.

Figure 1:
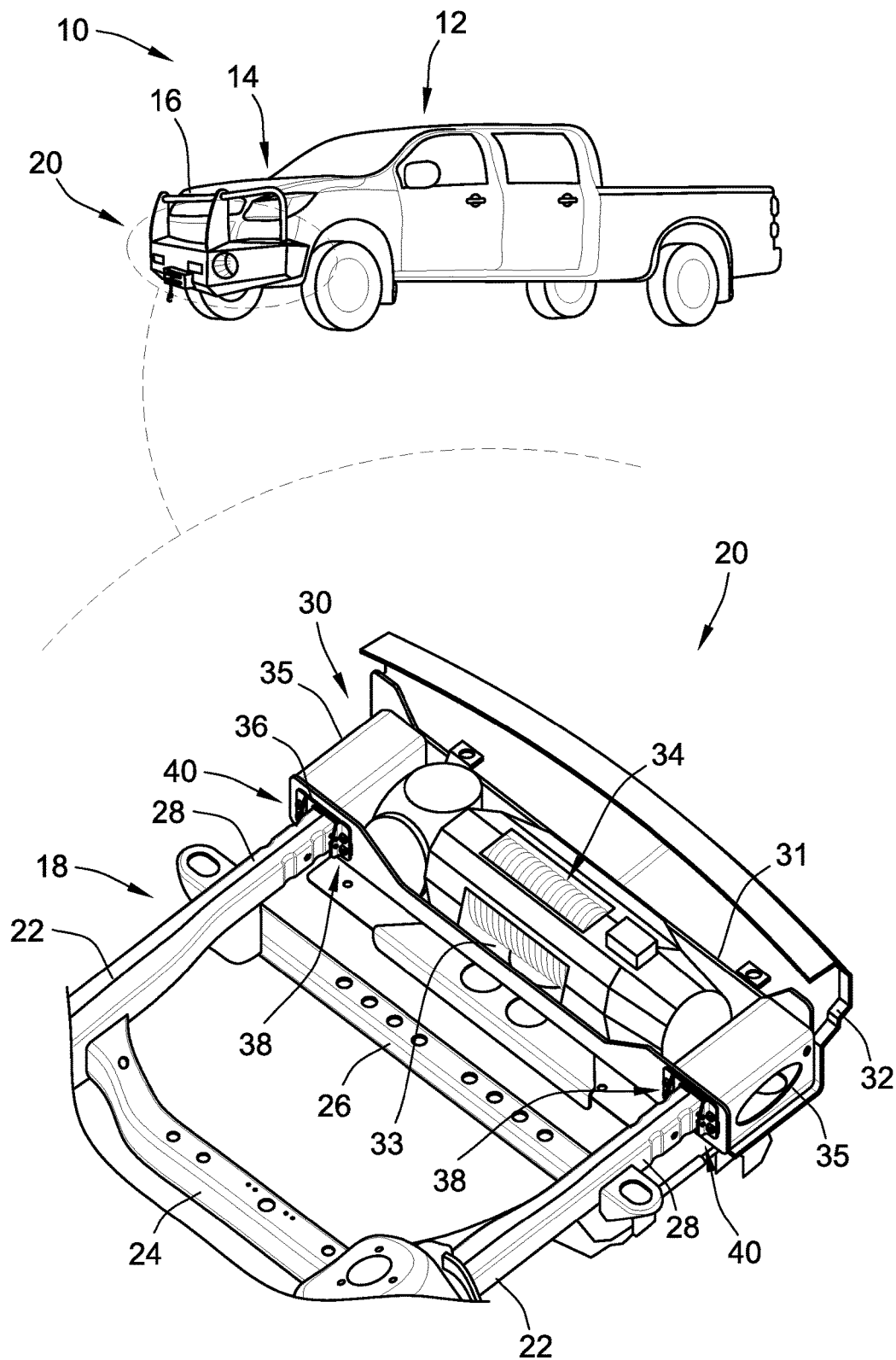
FIG. 1 is a front perspective-view illustration of a representative motor vehicle with an inset view of a representative bull bar device mounted to the vehicle chassis by a bull bar mounting assembly in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a perspective-view illustration of a representative automobile, which is designated generally at 10 and portrayed herein for purposes of discussion as an extended cab pickup truck. Mounted proximate a front end of the automobile 10, e.g., forward of the passenger compartment 12 and engine compartment 14, partially shielding a front grille 16, is a bull bar device and winch assembly 20. The illustrated automobile 10—also referred to herein as "motor vehicle" or "vehicle" for short—is merely an exemplary application with which the novel aspects and features of this disclosure may be practiced. In the same vein, the implementation of the present concepts into a front-end bull bar that incorporates a motor-driven winch should also be appreciated as an exemplary application of the novel concepts disclosed herein. As such, it will be understood that the aspects and features of the present disclosure may be applied to other bull bar assemblies and utilized for any logically relevant type of motor vehicle. Lastly, the drawings presented herein are not necessarily to scale and are provided purely for instructional purposes. Thus, the specific and relative dimensions shown in the drawings are not to be construed as limiting.

Serving to provide supplementary front-end protection and added energy-absorbing functionality, the bull bar device and winch assembly 20 of FIG. 1 (also collectively referred to herein as "bull bar device" or "bull bar" for short) is rigidly affixed to the front end of a vehicle chassis 18. For purposes of this Detailed Description, relative clauses and spatial adjectives, such as "front," "rear," "vertical" and "horizontal," are with respect to the vehicle and forward and reverse driving directions of the vehicle. In the abridged perspective view of the chassis 18 inset into FIG. 1 there is shown a pair of longitudinally oriented box-girder rails 22 interconnected by a U-shaped box-girder crossmember 24 and transverse rail 26. A pair of front chassis rails 28 cantilever the bull bar device 20 to the front end of the chassis 18, as will be described in extensive detail below. The front chassis rails 28 and box-girder rails 22 may cooperate to define a load travel path during a frontal impact event. Other under body structures and related features are deemed to be within the scope of this disclosure.

The bull bar assembly 20 may serve as an extension of the vehicle frame, upon which additional accessories may mount. One such accessory is a winch carrier 30, which may be a welded assembly or a single-piece design that is comprised of four main sections: a generally vertical front cross-guard section 31, a generally horizontal platform section 33, and a pair of fore-aft collapsible rails 35. The platform section 33 provides subjacent support for a motor-driven winch assembly 34, which is nested between the collapsible rails 35, aft of the cross-guard section 31. Covering and concealing the winch carrier 30 is a brush guard 32 with a fairlead passage (FIG. 1) through which passes the winch hook and cable. For at least some embodiments, the bull bar 20 is fabricated from high-strength metal, such as powder coated or cold-rolled t-304 stainless steel and tubing. The bull bar 20 may take on other known configurations, locations and attendant features without departing from the intended scope of this disclosure.

To operatively attach the bull bar device 20 to the front (or rear) end of the pickup truck 10, without changing the inertial pulse of the vehicle during an impact event, a bull bar mounting assembly 40 directly couples rear mounting interfaces 36 (FIG. 2) on a rear face of the winch carrier 30 to the chassis 18 (e.g., without interposed crush boxes or bumper mounts). By way of non-limiting example, the representative bull bar mounting assembly 40 illustrated in the drawings includes a pair of chassis rails 28, two pairs of mounting brackets 38, and two pairs of high-strength pins 42. Alternative embodiments may include greater or fewer rails 28, brackets 38 and/or pins 42 than that which are shown in the drawings. It is envisioned, for example, that the mounting assembly 40 comprise an enlarged single-piece hat-shaped bracket that mounts to a single expanded chassis rail via a single enlarged pin or other fastener. For at least some embodiments, the chassis rails 28 are substantially structurally identical mirrored images of one another; for purposes of brevity, both chassis rails 28 shown in FIG. 1 may be described by reference to the chassis rail 28 shown in FIGS. 2 and 3. In the same vein, the bracket pair 38 used on the driver-side chassis rail 28 (to the left in FIG. 1) may be structurally identical to the pair of brackets 38 used on the passenger-side chassis rail 28 (to the right in FIG. 1); for purposes of brevity, both pairs of brackets 38 shown in FIG. 1 may be generally represented by the brackets shown in FIGS. 2 and 3.

With reference to FIGS. 2 and 3, each chassis rail 28 is fabricated with an elongated body 21 having opposing longitudinal ends 23 and 25, respectively, that are connected by opposing lateral sidewalls 27 and opposing top and bottom walls 29 (only the top wall is visible in the drawings). In the illustrated example, the elongated body 21 is tubular with a generally rectangular-shaped transverse cross-section and round-chamfered corners. Optional configurations may include chassis rails with alternative shapes, sizes and orientations without departing from the intended scope of this disclosure. Each chassis rail 28 is attached at its first longitudinal end 23 to one of the vehicle chassis' box-girder rails 22, e.g., via extrusion, rolling, riveting, welding, fastening or other known forming and joining techniques. To this end, each chassis rail 28 may be integrally formed as a single-piece, unitary structure with a respective one of the box-girder rails 22 of the vehicle chassis 18. Conversely, the second longitudinal end 25 of the chassis rail 28 includes a mounting plate 44 that abuts and attaches to the bull bar device 20, e.g., via one or more bolts 50.

Adjacent the mounting plate 44 is a pair of cylindrical pin slots 46, shown as circular holes, that extend transversely through the elongated body 21 of the chassis rail 28. The size and number of pin slots/holes 46 will generally depend on the size and number of pins 42 utilized by the mounting assembly 40 to couple the mounting brackets 38 to the chassis rail 28. To ensure that the chassis rail 28 deforms in a controlled and predictable manner to help absorb a kinetic energy pulse generated from an impact event with an external object, the elongated body 21 is fabricated with one or more crush initiator beads 48 to trigger progressive compression and buckling in the monolithic structure. While the crush initiator features may take on various known forms, the crush initiator beads 48 are illustrated herein as a series of vertical channels fabricated into each sidewall 27 and spaced along the length of the chassis rail 28. Each crush initiator bead 48 is recessed into one of the lateral sidewalls 27 of the rail body 21, and paired in opposing spaced relation with a crush initiator bead 48 in the opposite sidewall. As shown, the high-strength pins 42 and pin slots 46 are located aft of the bull bar assembly 20, interposed between the mounting plate 44 and crush initiator beads 48. With the position of the high-strength pins 42 forward of the crush initiator beads 48, the inertial pulse of the vehicle is not altered by the addition of the bull bar assembly 20.

First and second mounting brackets 52A and 52B, respectively, are each attached to a respective lateral side 27 of the elongated body 21 of the chassis rail 28, displaced rearward from but adjacent to the mounting plate 44. Brackets 52A, 52B are shown in FIGS. 2 and 3 composed of a flexible body 51 having a coupling flange 55 projecting angularly from a coupling base 53. As best seen with the plan view illustration in FIG. 3, each bracket 52A, 52B may be a single-piece, unitary structure with an L-shaped cross-section comprised of the coupling flange 55 integrally formed with and projecting generally orthogonally from the coupling base 53. The coupling base 53 is affixed by high-strength pins 42 to the chassis rail 28 such that the plate-like base 53 is parallel to and set apart from the sidewall 27, and located adjacent to yet spaced from the mounting plate 44. For at least some embodiments, two high-strength pins 42 extend through the coupling base 53 and pin slots 46 to thereby rigidly affix the mounting bracket 52A, 52B to the chassis rail body 21. According to aspects of the disclosed concepts, the high-strength pins 42 are 8 mm diameter high strength steel pins that are preloaded and rated with a yield strength of about at least 460 MPA and, in some embodiments, at least 580 Mpa or above.

Coupling flange 55 is designed to rigidly attach the mounting bracket 52A, 52B to the mounting plate 44 and bull bar device 20. With continuing reference to FIGS. 2 and 3, each bracket coupling flange 55 is formed with one or more threaded fastener holes 54 for receiving respective fasteners 50 that interconnect the mounting plate 22 and mounting interface 36. By way of example, and not limitation, an internally threaded first fastener hole 54A receives therein and threadably mates with a first threaded fastener 50A to thereby directly attach the mounting bracket 52A, 52B to the bull bar device 20. An internally threaded second fastener hole 54B receives therethrough and threadably mates with a second threaded fastener 50B to thereby directly attach the mounting bracket 52A, 52B to the mounting plate 44. During assembly of the bull bar mounting assembly 40, the bracket body 51 is designed to expand and contract between undeformed and deformed states to help preload the high-strength pins 42. When the bracket body 51 is undeformed (as shown in FIG. 3), the coupling flange 55 is spaced from and unattached to the mounting plate 44. Conversely, torquing the fasteners 50 will cause the bracket body 51 to bend and expand to the deformed state (as shown in FIG. 2), whereat the coupling flange 55 abuts and attaches to the mounting plate 44 and the bull bar device 40. Expanding the mounting bracket in this manner creates a preload force on the pins 42.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A mounting assembly for attaching a bull bar device to a motor vehicle, the motor vehicle having a vehicle chassis, the mounting assembly comprising:
   a chassis rail with an elongated body having opposing first and second longitudinal ends, the first longitudinal end being configured to attach to the vehicle chassis, and the second longitudinal end including a mounting plate configured to attach to the bull bar device; and
   a mounting bracket with a flexible body having a coupling flange projecting at a non-zero angle from a coupling base, the coupling base being attached to the chassis rail adjacent to and spaced from the mounting plate, the coupling flange being configured to attach to the bull bar device and the mounting plate,
   wherein the flexible body of the mounting bracket is configured to expand from an undeformed state, whereat the coupling flange is spaced from and unattached to the mounting plate, to a deformed state, whereat the coupling flange abuts and attaches to the mounting plate and the bull bar device.

2. The mounting assembly of claim 1, wherein the chassis rail includes a pin slot located adjacent to the mounting plate, the mounting assembly further comprising a high-strength pin extending through the coupling base and the pin slot to thereby rigidly affix the mounting bracket to the chassis rail.

3. The mounting assembly of claim 2, wherein the pin slot includes a pair of pin slots extending transversely through the elongated body, and wherein the high-strength pin includes a pair of high-strength pins each extending through a respective one of the pin slots.

4. The mounting assembly of claim 2, wherein expanding the mounting bracket to the deformed state creates a preload force on the pin.

5. The mounting assembly of claim 3, wherein the chassis rail includes a plurality of crush initiator beads spaced along the length of the elongated body, and wherein the pin slot and high-strength pin are located between the mounting plate and the crush initiator beads.

6. The mounting assembly of claim 5, wherein the plurality of crush initiator beads includes two pairs of vertical channels, each pair of the vertical channels being recessed into a respective lateral side of the elongated body.

7. The mounting assembly of claim 1, wherein the mounting bracket includes first and second mounting brackets each attached to a respective lateral side of the elongated body of the chassis rail adjacent to the mounting plate.

8. The mounting assembly of claim 7, wherein the first and second mounting brackets each has an L-shaped cross-section with the coupling flange integrally formed with and projecting generally orthogonally from the coupling base.

9. The mounting assembly of claim 1, wherein the coupling flange includes first and second fastener holes, the first fastener hole being configured to receive therein a first fastener to thereby directly attach the mounting bracket to the bull bar device, and the second fastener hole being configured to receive therein a second fastener to thereby directly attach the mounting bracket to the mounting plate.

10. The mounting assembly of claim 9, wherein the first and second fastener holes include internal threading, and wherein the first and second fasteners includes bolts or screws that threadably mate with the internal threading of the first and second fastener holes.

11. The mounting assembly of claim 1, wherein the elongated body of the chassis rail is tubular with a generally rectangular-shaped transverse cross-section.

12. The mounting assembly of claim 1, wherein the vehicle chassis has opposing front and rear ends, and wherein the first longitudinal end of the elongated body of the chassis rail is configured to attach to the front end of the vehicle chassis.

13. The mounting assembly of claim 1, wherein the first longitudinal end of the elongated body of the chassis rail is integrally formed with the vehicle chassis.

14. A motor vehicle, comprising:
   a vehicle chassis with opposing front and rear ends;
   a bumper rail attached to the front end of the vehicle chassis;
   a bull bar device disposed forward of the bumper rail and including a rear mounting interface; and
   a bull bar mounting assembly, including:
      a pair of chassis front rails each including an elongated tubular body having opposing first and second longitudinal ends connected by sidewalls, each of the sidewalls including a series of crush initiator beads spaced along the length of the elongated body, the first longitudinal end attached to front end of the vehicle chassis, and the second longitudinal end including a mounting plate abutting the rear mounting interface of the bull bar device; and a pair of mounting brackets each including a flexible L-shaped body having a coupling flange projecting generally orthogonally from a coupling base, the coupling base being attached to a respective sidewall of a respective one of the chassis front rails adjacent to and spaced apart from a respective mounting plate, the coupling flange abutting the mounting plate and the rear mounting interface of the bull bar device, wherein the flexible body of each of the mounting brackets is configured to expand from an undeformed state, whereat the coupling flange is spaced from and unattached to the mounting plate, to a deformed state, whereat the coupling flange abuts and attaches to the mounting plate and the bull bar device.

15. A method of attaching a bull bar device to a motor vehicle, the motor vehicle having a vehicle chassis, the method comprising:

attaching a first longitudinal end of an elongated body of a chassis rail to the vehicle chassis;

positioning a mounting plate of a second longitudinal end of the elongated body of the chassis rail against the bull bar device;

positioning a mounting bracket against the chassis rail, the mounting bracket including a flexible body with a coupling flange projecting at an angle from a coupling base;

attaching the coupling base of the mounting bracket to the elongated body of the chassis rail such that the coupling base is adjacent to and spaced from the mounting plate; and attaching the coupling flange to the bull bar device and the mounting plate such that the flexible body of the mounting bracket expands from an undeformed state, whereat the coupling flange is spaced from and unattached to the mounting plate, to a deformed state, whereat the coupling flange abuts and attaches to the mounting plate and bull bar device.

16. The method of claim 15, wherein the chassis rail includes a pin slot located adjacent to the mounting plate, and wherein attaching the coupling base to the elongated body includes fitting a high-strength pin through the coupling base and the pin slot.

17. The method of claim 16, wherein the chassis rail includes a plurality of crush initiator beads spaced along the length of the elongated body, and wherein the pin slot and high-strength pin are located between the mounting plate and the crush initiator beads.

18. The method of claim 15, wherein the mounting bracket includes first and second integrally formed L-shaped mounting brackets each attached to a respective lateral side of the elongated body of the chassis rail.

19. The method of claim 15, wherein the vehicle chassis has opposing front and rear ends, and wherein the first longitudinal end of the elongated body of the chassis rail is attached to the front end of the vehicle chassis.

20. The method of claim 15, wherein attaching the first longitudinal end of the elongated body to the vehicle chassis includes integrally forming the chassis rail with the vehicle chassis.

* * * * *